Figure 1:
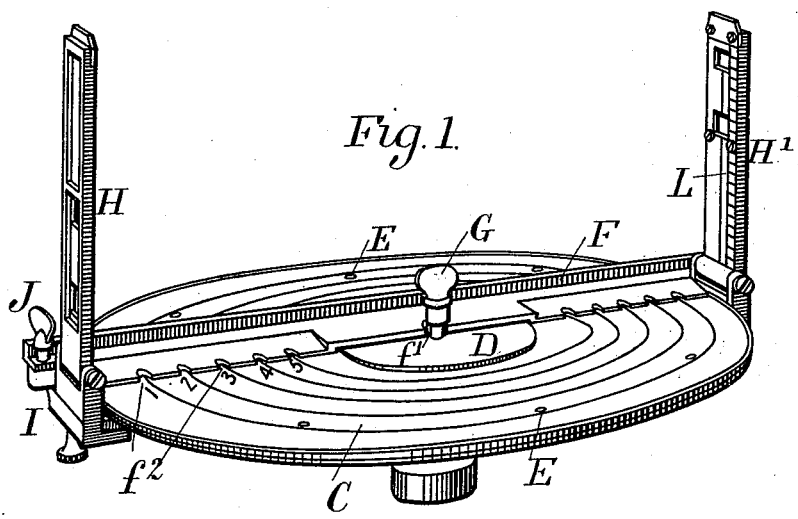

(No Model.) 2 Sheets—Sheet 1.

J. HENDERSON.
SURVEYING INSTRUMENT.

No. 510,339. Patented Dec. 5, 1893.

Witnesses:
G. W. Rea.
Thos. A. Gunn

Inventor;
James Henderson
By James L. Norris
Atty.

THE NATIONAL LITHOGRAPHING COMPANY,
WASHINGTON, D. C.

(No Model.) 2 Sheets—Sheet 2.

J. HENDERSON.
SURVEYING INSTRUMENT.

No. 510,339. Patented Dec. 5, 1893.

United States Patent Office.

JAMES HENDERSON, OF DALVENIE, NEAR TRURO, ENGLAND.

SURVEYING-INSTRUMENT.

SPECIFICATION forming part of Letters Patent No. 510,339, dated December 5, 1893.

Application filed April 27, 1893. Serial No. 472,119. (No model.)

*To all whom it may concern:*

Be it known that I, JAMES HENDERSON, a citizen of England, residing at Dalvenie, near Truro, in the county of Cornwall, England, have invented an Improved Surveying-Instrument, of which the following is a specification.

My invention relates to an instrument which I term the "rapid traverser," and which is based on what is known as the plane-table system of surveying, and by its means inclosed and opened traversers, both at surface and underground, can be accomplished and subsequently laid down on paper with very great rapidity, facility and accuracy. Unlike the plane-table, however, it is not intended that the "rapid traverser" should be used for plotting the survey in the field, a process involving many great objections, but this is done afterward in the drawing office, with the aid of a parallel rolling ruler and scale, and the result is highly satisfactory in every respect. The traverser may briefly be described as a circular metal table of about ten inches in diameter, mounted on an ordinary tripod stand, with the usual adjusting screws having a brass alidade with an ordinary "sight" at each end, revolving round a fixed center pin. Upon the face of the table, a disk of celluloid, Willesden waterproof paper, or other suitable material, is securely attached, by means of several small brass screws, over which the alidade, by means of a groove, can travel freely. Celluloid is to be preferred to any other material, as it requires no protection from the weather, and does not "buckle" under the effects of rain or water. This disk is divided into a number of concentric rings, slightly scratched, or grooved, or penciled on the celluloid, and the fiducial edge of the alidade is also thus divided with a small semicircular notch at each annulus, for the purpose of figuring or lettering the line observed and penciled on the disk. The object of these concentric rings is not only to allow of separate surveys being accomplished on one disk, but also to avoid overcrowding of direction lines in any particular spot on the disk. By means of the usual clamping screws the table carrying the celluloid disk can be clamped to the stand, and the alidade with the sights attached to the table when required.

Figure 2:
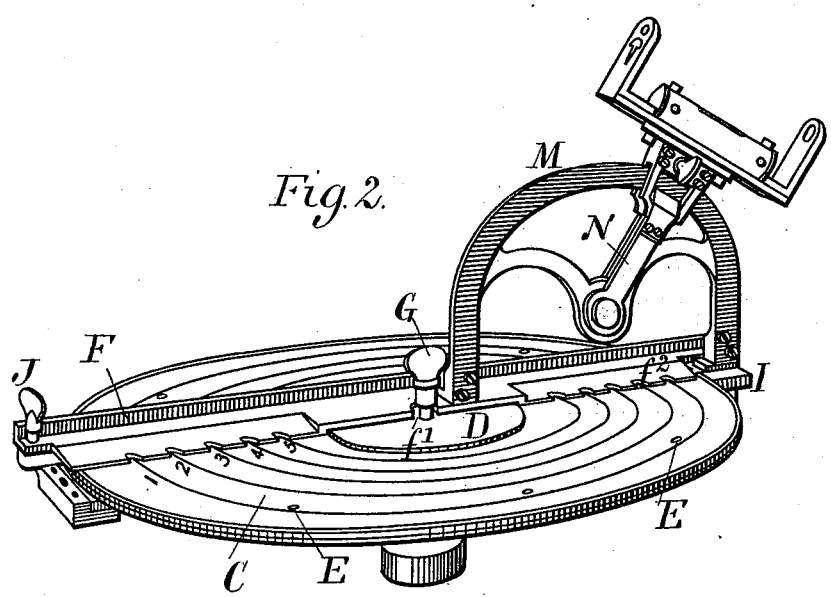
Figure 3:
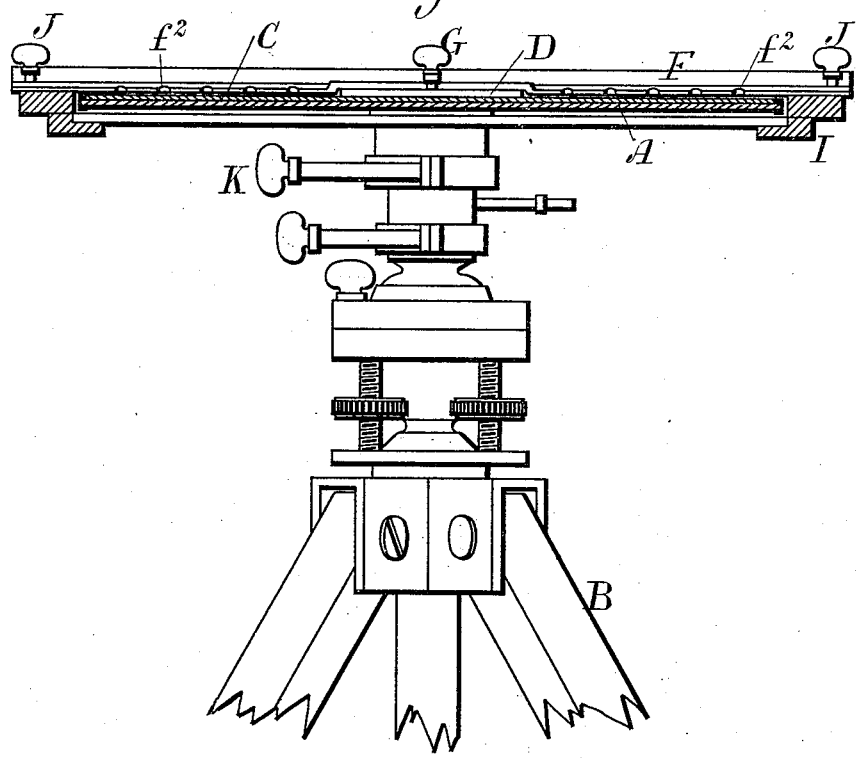
Figure 4:
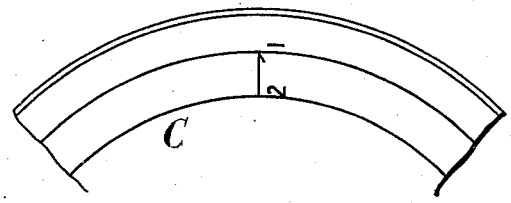

Figure 1 of the accompanying drawings shows a perspective view of the above described instrument. Fig. 2 is a modified construction with graduated semicircle for the accurate measurement of vertical angles. Fig. 3 is a vertical sectional view of the instrument showing a portion of a tripod stand in side elevation; and Fig. 4 illustrates the mode of marking the lines on the annular divisions of the disk on the table.

A is a metal table secured in the usual manner to a tripod stand B, and leveled by the aid of a small spirit level.

C is the celluloid disk, divided into five concentric rings 1, 2, 3, 4, 5 which are slightly scratched or penciled upon it.

D is a small holding down plate for securing the disk, which is also secured at the periphery by screw pins E.

F is the alidade, having a half round or angular notch $f'$ at the middle, fitting against a center pin G screwed into the table, and which forms the center pivot round which the alidade turns. On the beveled fiducial edge of the alidade which coincides with the diametral line passing through the center of the table are marked divisions corresponding to the divisions 1, 2, 3, &c., of the disk C, and at such divisions half round or angular notches $f^2$ are formed in the beveled edge to allow of suitable marks being made opposite the lines drawn on the disk.

H H' are respectively the leading and back sights attached by hinge joints to the lower frame I of the alidade, which is provided with screws J for clamping the alidade upon the table. The sights are constructed with sight holes in the usual manner.

The rapid traverser is worked as follows:— The instrument is set on its stand B in the usual way, and leveled by means of a small fixed or portable spirit level, and the alidade F is sighted (by a back sight) on the starting point of the survey, and both the alidade and the table are securely fixed by their respective clamps J and K. The direction of this first line of the survey is then marked with a finely pointed H. H. pencil on the selected annulus of the disk, at two points equidistant from the center, and duly lettered, or figured, within the notch cut in the fiducial edge of the alidade for this purpose. The alidade is then unclamped and sighted to the forward stand, or tripod, and clamped (three tripods being recommended for properly conducting a traverse) and the direction of the second line of the survey is marked on the annulus as before. The "traverser" is then removed from its stand and fixed, with the alidade still clamped, on the forward stand and sighted back to the tripod it formerly occupied, and clamped. This being done, the alidade is unclamped, sighted to another forward stand; it is again clamped and the direction of the third line of the survey duly marked, and figured, on the disk, and so on for the remainder of the traverse. The surveyor only recording on his book the lengths of the several lines, with offsets in the ordinary way.

The magnetic meridian is taken at any convenient spot in the course of the traverse by means of a "trough" compass placed temporarily against the back edge of the alidade; the line, thus given, penciled on the disk, establishing the polarity of the whole of the survey. The same disk on its table can be used on any disconnected part of a survey, by again placing the trough compass against the alidade, clamped on the previously penciled north line, the table being moved until the needle points to the north. The leading direction of each line is given by simply making a half arrow against the line before moving the alidade as at Fig. 4, thereby showing the course or direction of line 2. The fiducial edge of the alidade should always be to the surveyor's right hand, he facing in the direction of the traverse line, so as not only to afford greater facility for drawing, and figuring, the lines on the disk, but also to prevent any chance of misplacing the guiding half arrow referred to.

In order to use the "traverser" on hilly ground, the sights at each end of the alidade, are marked in degrees up to twenty-five degrees as indicated at L Fig. 1, so that by looking over the top of the back sight and getting the forward object in line with one of the divisions, the angle of declination can at once be read and recorded. Where greater accuracy in vertical angles is required, such as in diagonal shafts of a mine, a "quadrant," or properly speaking a semicircle, is attached to the alidade, as shown at M Fig. 2, and the angles read to minutes, as in the ordinary theodolite, or miner's dial. For this purpose the ordinary sights H H' being removed, and the graduated semicircle M fixed on the alidade F by means of screws. N is the pivoted arm with sights, vernier, and level as in ordinary theodolites and the like; or a telescope can replace the sights when required.

The method of using the traverser having now been given, it only remains to describe its application in the drawing office. One or more meridian lines having been drawn on the intended plan, the disk is removed from its circular table, and placed with the north line already marked on it in the field, in its proper position, and kept there by a weight or two. A heavy metal rolling parallel ruler is then applied to each line of the survey in succession as shown on the disk, and correctly marked off on the plan. In a large survey the disk can be moved to any one of the meridian lines as required; in short the disk becomes a protractor of great accuracy, and errors in misplotting can seldom occur, the actual lines drawn in the field, being, if carefully figured or numbered, represented in counterpart on the plan. For future reference the disk itself may be kept, the name and the date of the survey being recorded thereon, or the magnetic bearings of the lines may be read off with facility and the same entered in the field or survey book, when the celluloid disk can be cleaned with soap and water and rendered quite fit for the next occasion.

For rapid triangulation the "traverser" above described, can be used with great advantage. A suitable base line having been measured, it only needs to set up the "traverser" at each end in succession, when the bearings of all required distant points can be noted on the disk, and the work subsequently plotted in the office to any scale.

The instrument being very portable, requiring no skilled manipulation, no reading of angles and no subsequent calculation, would be found most useful for military purposes. It could be worked with rapidity in all weathers, and the salient points of the country, the position of the enemy, &c., subsequently mapped with speed and accuracy.

The traverser could also be used as a range finder, and with a previously measured base line, and traversers worked simultaneously from both ends, the range of even a moving object could be discovered, with an accuracy approximate enough to be of considerable advantage.

Having thus described the nature of my invention and the best means I know for carrying the same into practical effect, I claim—

1. In a traverser for surveying purposes, the combination with a table, adapted to be fixed on a stand, of a disk of celluloid or the like, temporarily secured on the table and marked with concentric annular divisions, an alidade pivoted to the center of the table and having divisions on its fiducial edge corresponding to those of the said disk, and a notch next each division, a sight at each end of the alidade, and means for clamping the alidade on the disk and table, substantially as described.

2. In a traverser for surveying purposes, the combination with a table adapted to be fixed on a stand, of a disk C of celluloid or other suitable waterproof material, having marked thereon concentric circular divisions for the reception of lines marked thereon by the aid of an alidade, substantially as described.

3. In a traverser for surveying purposes, the combination with a table A adapted to be fixed on a stand, of a disk C of celluloid or the like, having concentric circular division lines marked thereon, an alidade F pivoted to the center of the disk and table and having divisions with notches corresponding to the divisions of the disk, and sights H H' detachably mounted on the ends of the alidade, whereby on the removal of the sights a graduated semicircle with pivoted arm carrying sights or telescope and vernier for measuring angles, may be secured to the alidade, substantially as described.

In testimony whereof I have signed my name to this specification, in the presence of two subscribing witnesses, this 6th day of April, A. D. 1893.

JAMES HENDERSON.

Witnesses:
H. G. HENDERSON,
*Civil Engineer, Truro, Cornwall.*
D. PENLERICK,
*Engineering Assistant, Falmouth.*